(12) United States Patent
Gilmartin et al.

(10) Patent No.: US 8,753,735 B2
(45) Date of Patent: Jun. 17, 2014

(54) BIAS CHARGE ROLLER SURFACE COATING COMPRISED OF CARBON NANOTUBES

(75) Inventors: Brian P. Gilmartin, Williamsville, NY (US); Liang-Bih Lin, Carlsbad, CA (US); Jeanne M. Koval, Marion, NY (US); Jin Wu, Pittsford, NY (US); Aaron M. Stuckey, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/161,216

(22) Filed: Jun. 15, 2011

(65) Prior Publication Data

US 2012/0321850 A1 Dec. 20, 2012

(51) Int. Cl.
| | |
|---|---|
| *B32B 3/00* | (2006.01) |
| *B32B 5/00* | (2006.01) |
| *B32B 27/36* | (2006.01) |
| *G03G 5/04* | (2006.01) |
| *G03G 5/043* | (2006.01) |
| *G03G 5/047* | (2006.01) |
| *G03G 5/087* | (2006.01) |

(52) U.S. Cl.
 USPC ........... 428/143; 428/141; 428/147; 399/115; 399/170; 399/174; 399/176

(58) Field of Classification Search
 USPC .......... 428/141, 143, 147; 399/115, 170, 171, 399/172, 173, 174, 176; 524/495, 496
 See application file for complete search history.

(56) References Cited

U.S. PATENT DOCUMENTS

| | | | |
|---|---|---|---|
| 6,667,141 B2 * | 12/2003 | Iwamoto et al. ........... | 430/111.4 |
| 2003/0122111 A1 * | 7/2003 | Glatkowski ................... | 252/500 |
| 2007/0116628 A1 * | 5/2007 | Shew et al. ................. | 423/447.2 |
| 2008/0232853 A1 * | 9/2008 | Law .............................. | 399/176 |
| 2008/0305416 A1 * | 12/2008 | Wu et al. ...................... | 430/58.1 |
| 2010/0080978 A1 * | 4/2010 | Jerome et al. .............. | 428/317.9 |

OTHER PUBLICATIONS

Evidentiary Reference: CAPA 6500—Adhesive Applications—Rapid Prototype Applications—Thermoplas.*

* cited by examiner

*Primary Examiner* — Maria Veronica Ewald
*Assistant Examiner* — Joanna Pleszczynska
(74) *Attorney, Agent, or Firm* — MH2 Technology Law Group LLP (57) ABSTRACT

Various embodiments provide materials and methods for bias charging members including an outer surface coating, wherein the outer surface coating can include carbon nanotubes combined with polymer(s) to provide desirable surface, electrical, and/or mechanical properties.

19 Claims, 2 Drawing Sheets

BIAS CHARGE ROLLER SURFACE COATING COMPRISED OF CARBON NANOTUBES

DETAILED DESCRIPTION

Background

In a typical electrostatographic reproducing apparatus, a light image of an original to be copied is recorded in the form of an electrostatic latent image upon a photosensitive member. The electrostatic latent image is subsequently rendered visible by the application of electroscopic thermoplastic resin particles which are commonly referred to as toner. Specifically, the photosensitive member is charged and then exposed to light from an optical system or an image input apparatus to form the electrostatic latent image thereon. After the toner particles have been deposited on the surface of the photoconductive member, they are transferred to a copy sheet or to an intermediate transfer member and subsequently transferred to a copy sheet. Permanent images are then formed on the copy sheet by a fusing process.

Bias charge rollers (BCRs) are often used as chargers for corona charging the photosensitive member because they emit less ozone and are more environmentally friendly, as compared with scorotron chargers. However, BCR charging requires direct contact with the photosensitive member and with other related printer members. Due to this direct contact, stress is added on the surface of the BCRs as well as on the related printer members that come in direct contact with the BCRs. Surface deformations are then formed including streaks, abrasions, and pothole-like deformations that consequently produce print defects. For example, dark streaks and white/dark spots can appear as a result of degradation and/or debris built up on the surface of BCRs. Usage life of BCRs and the related printer members is then reduced.

There is a need to provide materials and methods for bias charging members with desirable surface, electrical, and/or mechanical properties to extend their usage life.

SUMMARY

According to various embodiments, the present teachings include a bias charging member. The bias charging member can include a conductive substrate for receiving an electrical bias; and an outer surface coating disposed over the conductive substrate. The outer surface coating can include a plurality of carbon nanotubes (CNTs) combined with one or more polymers to provide a surface roughness $R_z$ ranging from about 2 μm to about 20 μm. The one or more polymers can be selected from the group consisting of polycaprolactone, polyurethane, polyurea, polyolefin, polyimide, phenolic resin, aminoplast resin, copolymer derived from conjugated diene monomers, vinyl aromatic monomer, ethylenically unsaturated nitrile monomer, fluoropolymer, and combinations thereof.

According to various embodiments, the present teachings also include a method of forming a bias charging member by first providing a dispersion including a plurality of carbon nanotubes (CNTs) and one or more polymers. The one or more polymers can be selected from the group consisting of polycaprolactone, polyurethane, polyurea, polyolefin, polyimide, phenolic resin, aminoplast resin, copolymer derived from conjugated diene monomers, vinyl aromatic monomer, ethylenically unsaturated nitrile monomer, fluoropolymer, and combinations thereof. The dispersion can be applied to an outer base layer provided over a conductive substrate and then be solidified to form an outer surface coating on the outer base layer such that the formed outer surface coating has a surface roughness $R_z$ ranging from about 2 μm to about 20 μm.

According to various embodiments, the present teachings further include a bias charging device that includes a bias charging member. The bias charging member can include a conductive substrate and an outer surface coating disposed over the conductive substrate. The outer surface coating can include a plurality of carbon nanotubes (CNTs) combined with one or more polymers. The outer surface coating can have a surface resistivity ranging from about $10^5$ ohm/square to about $10^{10}$ ohm/square, and a surface roughness $R_z$ ranging from about 2 μm to about 20 μm. The one or more polymers can include polycaprolactone (PCL), polyurethane, polyurea, polyolefin, polyimide, phenolic resin, aminoplast resin, copolymer derived from conjugated diene monomers, vinyl aromatic monomer, ethylenically unsaturated nitrile monomer, fluoropolymer, and combinations thereof. The one or more polymers can be in a form of a polymer matrix, a plurality of polymer particles, and their combinations.

According to various embodiments, the present teachings further include a charging method by using a bias charging member. The bias charging member can include a conductive substrate and an outer surface coating disposed over the conductive substrate. The outer surface coating can include a plurality of carbon nanotubes (CNTs) combined with one or more polymers. The outer surface coating can have a surface resistivity ranging from about $10^5$ ohm/square to about $10^{10}$ ohm/square, and a surface roughness $R_z$ ranging from about 2 μm to about 20 μm. The conductive substrate of the bias charging member can then be electrically biased to charge a photosensitive member that is held in contact with the bias charging member.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present, teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1A:
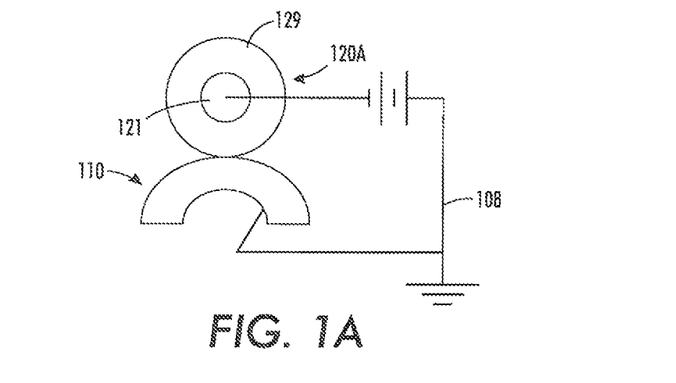
FIGS. 1A-1C depict various exemplary bias charging devices in accordance with various embodiments of the present teachings.
Figure 1B:
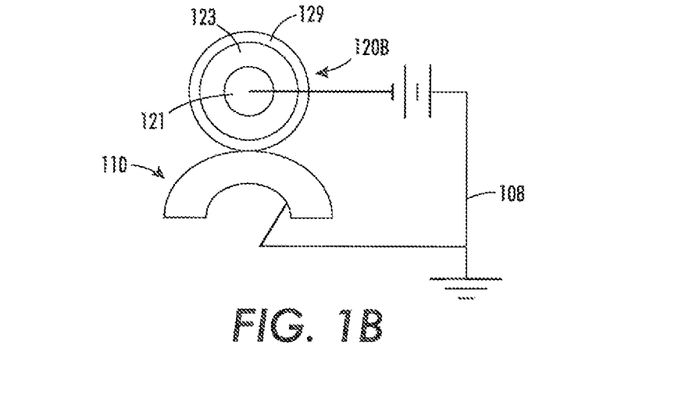
Figure 1C:
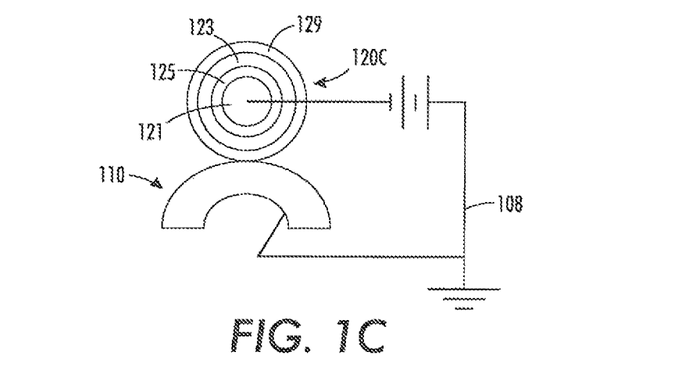

FIGS. 1A-1C depict various exemplary bias charging devices in accordance with various embodiments of the present teachings. For example, each device in FIGS. 1A-1C can include a photosensitive member, for example, a photoconductive drum 110, which can be charged on its surface by a charger to which a voltage can be supplied by a power source 108. The charger can be, for example, a bias charging member in a form of a bias charging roller 120 A-C as depicted in FIGS. 1A-1C, although one of ordinary skill in the art will understand that other types of bias charging member can be used including a bias charging belt, sheet, film, or drelt (a cross between a belt and a drum) in accordance with various embodiments of the present teachings. Accordingly, various conductive substrates in a form of a roller, a belt, and/or a drelt can be used for the bias charging members in the bias charging devices.

Each exemplary bias charging roller 120 A-C can include an outer surface coating 129 disposed over a conductive substrate such as a conductive core 112. As shown in FIGS. 1A-1C, while the bias charge roller 120 A-C is in rotation, a DC voltage and optional AC current can be applied from the power source 108 to the conductive core 121 of the bias charging roller 120 A-C to cause it to charge the photosensitive drum 110.

Although each bias charging member 120 A-C in FIGS. 1A-1C is held in contact with the exemplary photoconductive drum 110, one of ordinary skill in the art will understand that the bias charging member 120 A-C can be used for charging a dielectric receiver or other suitable members to be charged. Additionally, instead of using a photoconductive drum, the photoconductive member can be in a form of a belt, a film, a drelt, or other known photoconductive members.

In one embodiment, the bias charging roller 120A in FIG. 1A can include the conductive core 121 and the outer surface coating 129 directly provided on the conductive core 121 in accordance with various embodiments of the present teachings.

In another embodiment, the disclosed outer surface coating 129 can be a protective layer applied on conventional bias charging members having an outer base layer 123 disposed on the conductive core 112 as shown in FIG. 1B. Specifically, the exemplary bias charging roller 120B shown in FIG. 1B can include all of the elements of FIG. 1A and further include an optional outer base layer 123 positioned between the inner conductive core 121 and the outer surface coating 129. In embodiments, the outer base layer 123 can be a surface layer of conventional BCRs.

In embodiments, other layers, such as intermediate layers and/or adhesive layers can be disposed between adjacent layers of FIGS. 1A-1B, for example, between the conductive core 121 and the outer base layer 123, and/or between the outer base layer 123 and the disclosed outer surface coating 129, and/or between the conductive core 121 and the disclosed outer surface coating 129, when the outer base layer 123 is optional. For example, as shown in FIG. 10, the bias charging roller 120C can include an outer surface coating 129 provided on an outer base layer 123, which is provided over an conductive core 121 having an optional layer 125 of one or more of an intermediate layer and an adhesive layer disposed between the conductive core 121 and the outer base layer 123. In embodiments, the optional layer 125 can be positioned between any adjacent layers of the bias charging rollers.

The conductive core 121 in FIGS. 1A-1C can serve as an electrode and a supporting member of each bias charging roller 120 A-C. The conductive core 121 can be formed of an electro-conductive material including, but not limited to, a metal or metal alloy of aluminum, copper alloy, stainless steel, or the like; iron coated with chromium or nickel plating; and/or an electro-conductive resin and the like. The diameter of the electro-conductive support can be, for example, from about 1 mm to about 20 cm, or from about 3 mm to about 10 cm, or from about 5 mm to about 2 cm. Any suitable conductive cores or substrates as known to one of ordinary skill in the art can be used in accordance with various embodiments of the present teachings.

The outer base layer 123 can be formed of materials including, for example, isoprenes, chloroprenes, epichlorohydrins, butyl elastomers, polyurethanes, silicone elastomers, fluorine elastomers, styrene-butadiene elastomers, butadiene elastomers, nitrile elastomers, ethylene propylene elastomers, epichlorohydrin-ethylene oxide copolymers, epichlorohydrin-ethylene oxide-allyl glycidyl ether copolymers, ethylene-propylene-diene (EPDM) elastomers, acrylonitrile-butadiene copolymers or rubbers (NBR), natural rubber, and the like, and combinations thereof. The outer base layer 123 can have a thickness of from about 10 mm to about 20 cm, for example from about 50 mm to about 3 cm. The outer base, layer 123 can have an electrical surface resistivity ranging from about $10^5$ ohm/square to about $10^{13}$ ohm/square, or from about $10^6$ ohm/square to about $10^{11}$ ohm/square, or from about $10^7$ ohm/square to about $10^{10}$ ohm/square. In embodiments, the dimensions, and/or the electrical, mechanical, and/or other features of the outer base layer 123 are not limited.

The optional intermediate layers and/or adhesive layers can be applied to achieve desired properties and performance objectives of the disclosed bias charging members. Exemplary intermediate layers can be an elastomer layer, such as an intermediate conductive rubber layer formed of materials including, for example, silicone, EPDM, urethane, epichlorohydrin, etc. Exemplary adhesive layers can be formed of, for example, epoxy resins and polysiloxanes. Adhesives can include proprietary materials such as THIXON 403/404, Union Carbide A-1100, Dow H41, Dow TACTIX 740, Dow TACTIX 741, and Dow TACTIX 742.

Any suitable filler materials can be included in each layer of the bias charging member 120 A-C, including the outer base layer 123, intermediate layers, adhesive layers, and/or the outer surface coating 129. Exemplary filler materials can include, but are not limited to, carbon black such as Ketjen Black and acetylene black; pyrolytic carbon, graphite; metal or metal alloy such as aluminum, copper, nickel and stainless steel; metal oxides, doped metal oxides, such as tin oxide, indium oxide, titanium oxide, tin oxide-antimony oxide solid solution, and tin oxide-indium oxide solid solution; insulating materials having a surface treated by an electro-conductive process and the like; perchlorates or chlorates of tetraethylammonium, lauryltrimethyl ammonium and the like; perchlorates or chlorates of alkali metal such as lithium and magnesium, and salts of alkali or alkaline-earth metals; and the like; and/or their combinations.

In embodiments, instead of using bias charging rollers, various bias charging belts or sheets or drelts, e.g., corresponding to the materials and structures of the rollers 120 A-C, can be used for charging the photosensitive member or other components in accordance with various embodiments of the present teachings.

Figure 2A:
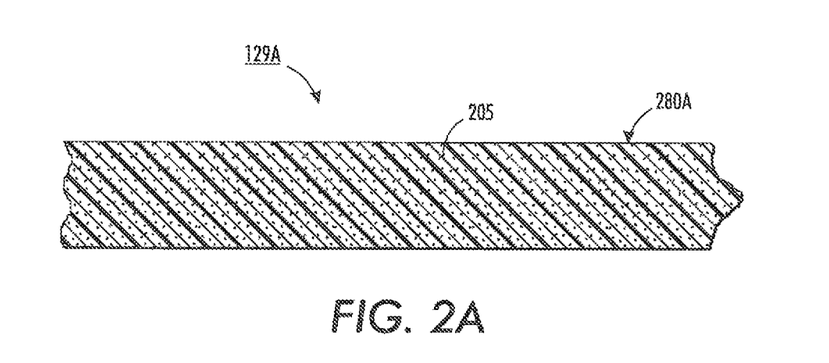
FIGS. 2A-2B depict various exemplary outer surface coatings for bias charging members in accordance with various embodiments of the present teachings.
Figure 2B:
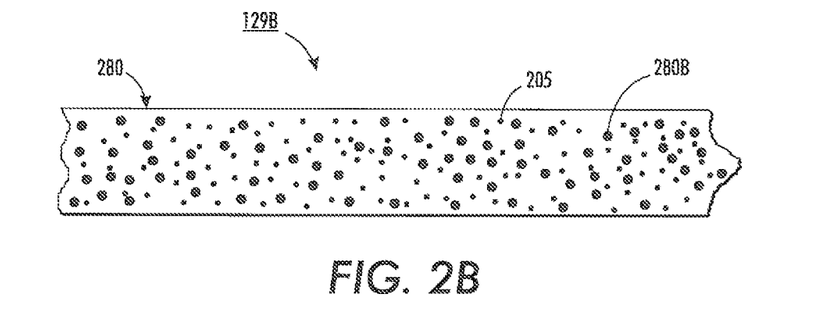

The disclosed outer surface coating 129 for each bias charging member 120 A-C can include at least a plurality of carbon nanotubes (CNTs) combined with one or more polymers. For example, FIGS. 2A-2B depict various exemplary outer surface coatings 129 A-B in accordance with various embodiments of the present teachings. As shown, the one or more polymers can form a polymer matrix 280A and/or 280 as shown in FIGS. 2A-2B and/or can be polymer particles 280B as shown in FIG. 2B. The polymer particles 280B can have an average particle size ranging from about 20 nm to about 10 µm, or from about 100 nm to about 2 µm, or from about 300 nm to about 1 µm dispersed within the outer surface coating 129B. The CNTs can be used as conductive fillers.

As used herein and unless otherwise specified, the term "carbon nanotubes" or CNTs refers to an elongated carbon material that has at least one minor dimension, for example, width or diameter, of about 100 nanometers or less. The CNTs can have an average outer diameter ranging from about 10 nm to about 90 nm, or from about 15 nm to about 70 nm, or from about 20 nm to about 50 nm; an average surface area ranging from about 20 $m^2/g$ to about 1,000 $m^2/g$, or from about 100 $m^2/g$ to about 800 $m^2/g$, or from about 200 $m^2/g$ to about 600 $m^2/g$; and an average aspect ratio ranging from about 10 to about 300, or from about 20 to about 200, or from about 30 to about 100, although the dimensions of the CNTs are not limited.

In one embodiment, the CNTs 205 can be considered as one atom thick layers of graphite, called graphene sheets, rolled up into nanometer-sized cylinders, tubes or other shapes. In embodiments, the CNTs can include single wall carbon nanotubes (SWCNTs), multi-wall carbon nanotubes (MWCNTs), and/or their various functionalized and derivatized fibril forms.

The outer surface coating 129 can also include one or more polymers. Exemplary polymers can include, but are not limited to, polycaprolactone (PCL), polyurethane, polyurea, polyolefin, polyimide, phenolic resins, aminoplast resins; copolymers derived from conjugated diene monomers, vinyl aromatic monomers, and ethylenically unsaturated nitrile monomers, fluoropolymers and combinations thereof.

In an exemplary embodiment, polycaprolactones can be thermoplastic and can have a weight average molecular weight ranging from about 10,000 to about 80,000, such as from about 20,000 to about 50,000, or from about 25,000 to about 45,000. Commercially available examples of thermoplastic polycaprolactones can include Capa® 6250 and Capa® 6100 (Perstorp AB of Perstorp, Sweden, and/or Perstorp USA of Toledo, Ohio).

In another exemplary embodiment, copolymers derived from conjugated diene monomers, vinyl aromatic monomers, and/or ethylenically unsaturated nitrile monomers can include styrene-butadiene (SB) copolymers, acrylonitrile-butadiene (NBR) copolymers, acrylonitrile-butadiene-styrene (ABS) terpolymers, and the like, and combinations thereof. In a particular embodiment, the polymers used for the outer surface coating 129, 129 A/B can be a thermoplastic acrylonitrile-butadiene-styrene (ABS) terpolymer. Acrylonitrile can include from about 15 wt % to about 35 wt % of the ABS terpolymer. Butadiene can include from about 5 wt % to about 30 wt % of the ABS terpolymer. Styrene can include from about 40 wt % to about 60 wt % of the ABS terpolymer. A commercially available example of ABS copolymers can include, for example, Blendex® 200 from Chemtura Corp. of Middlebury, Conn.

Various polyurethanes can suitably be used herein as a thermoplastic or thermoset polymer for the outer surface coating 129, 129 A/B. In embodiments, suitable polyurethanes can be derived from polyacrylates and polyisocyanates. Suitable polyurethanes can include, but are not limited to, reaction products of polyaspartic acid ester and isocyanate ("2K urethane"); reaction products of hydroxy-functional polyacrylates and isocyanate; and the like, and combinations thereof. Commercially available examples of polyacrylates can include Desmophen® NH 1120 and Desmophen® A 450 BA (Bayer Material Science AG of Leverkusen, Germany). Commercially available examples of isocyanates can include Desmodur® BL 3175A (Bayer Material Science AG of Leverkusen, Germany).

Various phenolic resins can be used herein as the polymer for the outer surface coating 129, 129 A/B. As used herein, the term "phenolic resins" refers to condensation products of an aldehyde with a phenol source in the presence of an acidic or basic catalyst.

The phenol source can be, for example, phenol, alkyl-substituted phenols such as cresols and xylenols; halogen-substituted phenols such as chlorophenol; polyhydric phenols such as resorcinol or pyrocatechol; polycyclic phenols such as naphthol and bisphenol A; aryl-substituted phenols; cycloalkyl-substituted phenols; aryloxy-substituted phenols; and the like, and combinations thereof. In various embodiments, the phenol source can be phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, multiple ring phenols such as bisphenol A, and combinations thereof.

The aldehyde for use in making the phenolic resin can be, for example, formaldehyde, paraformaldehyde, acetaldehyde, butyraldehyde, paraldehyde, glyoxal, furfuraldehyde, propinonaldehyde, benzaldehyde, and combinations thereof. In one embodiment, the aldehyde can be formaldehyde.

Non-limiting examples of phenolic resins can include dicyclopentadiene type phenolic resins, phenol novolak resins, cresol novolak resins, phenol aralkyl resins, and combinations thereof. Other non-limiting examples of phenolic resins can include alcohol-soluble resol-type phenolic resins such as PHENOLOTE® J-325 (DIC Corp. of Tokyo, Japan); formaldehyde polymers with phenol, p-tert-butylphenol, and cresol, such as VARCUM™ 29159 and 29101 (OxyChem. Co.) and DURITE® 97 (Borden Chemical); or formaldehyde polymers with ammonia, cresol, and phenol, such as VARCUM® 29112 (OxyChem. Co.); or formaldehyde polymers with 4,4'-(1-methylethylidene)bisphenol such as VARCUM® 29108 and 29116 (OxyChem. Co.); or formaldehyde polymers with cresol and phenol such as VARCUM™ 29457 (OxyChem. Co.), DURITE® SD-423A, SD-422A (Borden Chemical); or formaldehyde polymers with phenol and p-tert-butylphenol such as DURITE® ESD 556C (Border Chemical).

In embodiments, the phenolic resins can be used as-is or they can be modified. For example, the phenolic resins can be modified with suitable plasticizers, e.g. including but not limited to polyvinyl butyral, nylon resins, thermoset acrylic resins, polyvinyl formal, alkyds, epoxy resins, phenoxy resins (bisphenol A, epichlorohydrin polymer, and the like), polyamides, polyacrylates, oils, and the like, and combinations thereof. Various modifiers are known under various trade names, including but not limited to DESMOPHEN®, DESMODUR®, BUTVAR®, ELVAMIDE®, DORESCO®, SILCLEAN®, and PARALOID®.

Various aminoplast resins can be used herein as the polymer for the outer surface coating 129, 129 A/B. As used herein, the term "aminoplast resin" refers to amino resins made from a nitrogen-containing substance and formaldehyde, wherein the nitrogen-containing substance can include melamine, urea, benzoguanamine, and/or glycoluril. The aminoplast resins can be highly alkylated or partially alkylated. In embodiments, the aminoplast resins can be used as-is or they can be modified. For example, the aminoplast resins can be modified with suitable plasticizers, e.g. including but not limited to polyvinyl butyral, nylon resins, thermoset acrylic resins, polyvinyl formal, alkyds, epoxy resins, phenoxy resins (bisphenol A, epichlorohydrin polymer, and the like), polyamides, polyacrylates, oils, and the like, and combinations thereof. Various modifiers are known under various trade names, including but not limited to DESMOPHEN®, DESMODUR®, BUTVAR®, ELVAMIDE®, DORESCO®, SILCLEAN®, and PARALOID®.

If melamine is used, the resulting aminoplast resin can be known as a "melamine resin". Melamine resins are known under various trade names, including but not limited to CYMEL®, BEETLE®, DYNOMIN®, BECKAMINE®, UFR®, BAKELITE®, ISOMIN®, MELAICAR®, MELBRITE®, MELMEX®, MELOPAS®, RESART®, and ULTRAPAS®.

In embodiments, the melamine resin can have a generic formula of:

in which $R_1$, $R_2$, $R_3$, $R_4$, $R_5$ and $R_6$ each independently represents a hydrogen atom or an alkyl chain with 1 to 8 carbon atoms, or with 1 to 4 carbon atoms.

The melamine resin can be water-soluble, dispersible or indispersible. In various embodiments, the melamine resin can be highly alkylated/alkoxylated, partially alkylated/alkoxylated, or mixed alkylated/alkoxylated. In various embodiments, the melamine resin can be methylated, n-butylated or isobutylated. In other embodiments, the melamine resin can have low methylol and high imino content. In embodiments, the melamine resin can be described as oligomeric in nature with methoxymethyl and imino main functionalities. Non-limiting examples of the melamine resin can include methylated high imino melamine resins (partially methylolated and highly alkylated) such as CYMEL® 323, 325, 327, 328, 385; highly methylated melamine resins such as CYMEL® 350, 9370; partially methylated melamine resins (highly methylolated and partially methylated) such as CYMEL® 373, 370; high solids mixed ether melamine resins such as CYMEL® 1130, 324; n-butylated melamine resins such as CYMEL™ 1151, 615; n-butylated high imino melamine resins such as CYMEL® 1158; iso-butylated melamine resins such as CYMEL® 255-10. CYMEL® melamine resins are commercially available from Cytec Industries Inc. of Woodland Park, N.J.

In embodiments, the melamine resin can be selected from methylated formaldehyde-melamine resin, methoxymethylated melamine resin, ethoxymethylated melamine resin, propoxymethylated melamine resin, butoxymethylated melamine resin, hexamethylol melamine resin, alkoxyalkylated melamine resins such as methoxymethylated melamine resin, ethoxymethylated melamine resin, propoxymethylated melamine resin, butoxymethylated melamine resin, and mixtures thereof.

In embodiments, if urea is used, the resulting aminoplast resin is also known as a "urea resin". Urea resins are known under various trade names, including but not limited to CYMEL® BEETLE® DYNOMIN® BECKAMINE® and AMIREME®.

In embodiments, the urea resin can have a generic formula of:

in which $R_1$, $R_2$, $R_3$, and $R_4$ each independently represents a hydrogen atom or an alkyl chain with 1 to 8 carbon atoms, or with 1 to 4 carbon atoms.

In embodiments, the urea resin can be water-soluble, dispersible or indispersible. In various embodiments, the urea resin can be highly alkylated/alkoxylated, partially alkylated/alkoxylated, or mixed alkylated/alkoxylated. In various embodiments, the urea resin can be methylated, n-butylated or isobutylated. Non-limiting examples of the urea resin can include methylated urea resins such as CYMEL® U-65, U-382; n-butylated urea resins such as CYMEL® U-1054, UB-30-B; iso-butylated urea resins such as CYMEL® U-662, UI-19-I. CYMEL® urea resins are commercially available from Cytec Industries Inc. of Woodland Park, N.J.

In embodiments, if benzoguanamine is used, the resulting aminoplast resin is also known as a "benzoguanamine resin". Benzoguanamine resins are known under various trade names, including but not limited to CYMEL®, BEETLE®, and UFORMITE®.

In embodiments, the benzoguanamine resin can have a generic formula of:

in which $R_1$, $R_2$, $R_3$, and $R_4$ each independently represents a hydrogen atom or an alkyl chain with 1 to 8 carbon atoms, or with 1 to 4 carbon atoms.

The benzoguanamine resin can be water-soluble, dispersible or indispersible. In various embodiments, the benzoguanamine resin can be highly alkylated/alkoxylated, partially alkylated/alkoxylated, or mixed alkylated/alkoxylated. In various embodiments, the benzoguanamine resin can be methylated, n-butylated or isobutylated. Non-limiting examples of the benzoguanamine resin can include CYMEL® 659, 5010, 5011. CYMEL® benzoguanamine resins are commercially available from Cytec Industries Inc. of Woodland Park, N.J.

In embodiments, if glycouracil is used, the resulting aminoplast resin is also known as a "glycoluril resin". Glycoluril resins are known under various trade names, including but not limited to CYMEL®, and POWDERLINK®.

In embodiments, the glycoluril resin can have a generic formula of:

in which $R_1$, $R_2$, $R_3$, and $R_4$ each independently represents a hydrogen atom or an alkyl chain with 1 to 8 carbon atoms, or with 1 to 4 carbon atoms.

The glycoluril resin can be water-soluble, dispersible or indispersible. In various embodiments, the glycoluril resin can be highly alkylated/alkoxylated, partially alkylated/alkoxylated, or mixed alkylated/alkoxylated. In various embodiments, the glycoluril resin can be methylated, n-butylated or isobutylated. Non-limiting examples of the glycoluril resin include CYMEL® 1170, 1171. CYMEL® glycoluril resins are commercially available from Cytec Industries Inc. of Woodland Park, N.J.

In embodiments, fluorine-containing polymers or fluoropolymers can be used for the outer surface coating 129, 129 A/B, for example, as fluoropolymer particles. These fluoropolymers can include, e.g., a monomeric repeat unit that is selected from the group consisting of vinylidene fluoride, hexafluoropropylene, tetrafluoroethylene, perfluoroalkylvinylether, and mixtures thereof. The fluoropolymers can include linear or branched polymers, and cross-linked fluoroelastomers. Examples of fluoropolymer can include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. In embodiments, fluoropolymers and/or their particles can provide chemical and thermal stability and have a low surface energy. The fluoropolymers and/or their particles can have a melting temperature of from about 255° C. to about 360° C. or from about 280° C. to about 330° C. In a certain embodiment, the exemplary fluoropolymers and/or their particles can be melted to form the outer surface coating.

Referring back to FIGS. 2A-2B, CNTs 205 can be chemically and/or physically bonded to the polymer matrix 280A of FIG. 2A, the polymer particles 280B of FIG. 2B and/or the polymer matrix 280 of FIG. 2B.

As used herein, the CNTs being "chemically bonded" to a polymer matrix or polymer particles refers to chemical bonding such as ionic or covalent bonding, and not to such weaker bonding mechanisms, e.g., a physical bonding, such as hydrogen bonding or physical entrapment of molecules that may occur when two chemical species are in close proximity to each other. For example, CNTs 205 can be chemically and/or physically bonded with each of the polymer matrix 280A-280 and polymer particles 280B to form a CNT-polymer complex for the outer surface coating 129 A/B.

In one embodiment, the CNTs 205 can be physically mixed with or dispersed in the polymer particles 280B and/or the polymer matrices 280A and/or 280, without being chemically bonded to (such as being crosslinked with) the polymers that form the polymer particles and/or the polymer matrices. In another embodiment, the CNTs can be chemically bonded to the polymer chain of the polymer particles and matrices. In still another embodiment, some CNTs can be physically mixed with the polymer particles and matrices, while other CNTs can be chemically bonded to the polymer particles and matrices. In embodiments, the CNTs 205 and the polymer particles 2806 can be independently dispersed within the polymer matrix 280 of the outer surface coating 1296. The polymer matrix 280 can be formed of one or more polymers the same or different from the polymer particles 280B.

The outer surface coating 129, 129A/B can be formed by various film-formation techniques including a coating process, followed by a solidifying process such as a curing, drying, melting, and/or cooling process to physically or chemically crosslink the polymers to form a polymer matrix.

For example, a dispersion including CNTs and one or more polymers (e.g., PCL) can be prepared by, e.g., ball milling them in a solvent such as a toluene. This process can take several days. The dispersion can include a solid percentage by weight ranging from about 5% to about 60%, or from about 10° A) to about 50%, or from about 20% to about 40%. The dispersion can then be coated to, for example, the conductive core 121 of a BCR, an intermediate layer of a BCR, an adhesive layer of a BCR, and/or a conventional outer base layer of a conventional BCR. Exemplary coating techniques for applying the dispersion onto a surface can include, but are not limited to, dip coating, roller coating, spray coating, rotary atomizers, ring coating, die casting, flow coating, and the like. The applied or coated dispersion can then be solidified, e.g., cured or dried, according to the polymers used.

Alternatively, the dispersion can be prepared to include CNTs and a plurality of polymer particles. In embodiments, the polymer particles can be contained in a polymer particle dispersion, which is then mixed with conductive fillers. For example, a mixture containing CNTs and polymer particles can be formed to have the desirable solid percentage as described above.

In one embodiment, the film or layer formation of the dispersion containing the CNTs and the polymer particles can be coated to, e.g., a conductive substrate, an intermediate layer, an adhesive layer, and/or an outer base layer of a BCR. The coated dispersion can further be processed by, e.g., at least partially melting a portion of the polymer particles, followed by, e.g., a cooling process. This partial melting of the polymer particles can form a polymer matrix 280 as depicted in FIG. 2B.

In another embodiment, the film or layer formation of the dispersion containing the CNTs and the polymer particles can be processed by admixing a second polymer therewith, e.g., using the ball milling process in a suitable solvent. The second polymer can be the same or different from the polymer particles. The dispersion containing CNTs, polymer particles, and the second polymer can have the desirable solid weight percentage as described above, e.g., ranging from about 5% to about 60%, or from about 10% to about 50%, or from about 20% to about 40%. The dispersion can then be coated to, for example, a conductive substrate, an intermediate layer, an adhesive layer, and/or an outer base layer of a BCR. Exemplary coating techniques for applying the dispersion onto a surface can include, but are not limited to, dip coating, roller coating, spray coating, rotary atomizers, ring coating, die casting, flow coating, and the like. The applied or coated dispersion can then be solidified, e.g., cured or dried, according to the polymers used. The outer surface coating 129B can then be formed to have both conductive fillers 205 and the polymer particles 280B dispersed in the polymer matrix 280.

In other cases, the dispersion containing CNTs and polymers having certain amount solids can also be applied on a separate substrate surface to form a solidified layer, which is then removed from the substrate after the layer formation and then applied as an outer surface coating 129, 129 A/B to a corresponding layer (e.g., the conductive core, the outer base layer, etc.) of a bias charging member.

The formed outer surface coating 129, 129A/B, depicted in FIGS. 1A-1C and 2A-2B can have a thickness ranging from about 1 μm to about 100 μm, for example, from about 3 μm to about 40 μm, or from about 4 μm to about 20 μm, although the thickness of the outer surface coating is not limited.

In embodiments, the particular surface, electrical, mechanical, and/or structural properties for the resulting bias charging members can be chosen and controlled depending on the amount/selection of CNTs and polymers. In embodiments, CNTs can be present in the outer surface coating in an amount of less than about 10%, or less than about 5%, for example, ranging from about 0.1% to about 4%, or from about 0.2% to about 3%, or from about 0.3% to about 2%, by weight of the total solids of the outer surface coating. That is, CNTs do not require significant weight loading for obtaining, e.g., the surface resistivity necessary for the bias charging, which is un-like conventional conductive fillers that require a general weight loading of from about 10% to about 50% in order to obtain the same surface resistivity needed for the bias charging. As a result, the overall structural integrity of the outer surface coating can be improved due to the lower weight loading of CNTs.

In this manner, the outer surface coating can provide each bias charging member 120 A-C with a surface having a surface resistivity ranging from about $10^5$ ohm/square to about $10^{10}$ ohm/square, or from about $10^6$ ohm/square to about $10^9$ ohm/square, or from about $10^7$ ohm/square to about $10^8$ ohm/square, which is virtually unaffected by numerous environmental and mechanical changes.

In embodiments, the outer surface coating can provide the bias charging member 120 A-C with a surface having a roughness $R_z$ ranging from about 2 μm to about 20 μm, or from about 4 μm to about 15 μm, or from about 6 μm to about 10 μm.

As used herein, the term "surface roughness Rz" refers to a ten-point mean surface roughness as disclosed in the standard JIS B 0601-1982. The terms, surface roughness, profile, reference length of profile, roughness curve, cut-off value, mean line of profile, and profile peak and valley are as defined in the standard. For example, the ten-point mean roughness shall be the value of difference, being expressed in micrometer (μm), between the mean value of altitudes of peaks from the highest to the $5^{th}$ in height, measured in the direction of vertical magnification from a straight line that is parallel to the mean line and that does not intersect the profile, and the mean value of altitudes of valleys from the deepest to the $5^{th}$ in depth, within a sampled portion, of which length corresponds to the reference length, from the profile. The profile may be depicted by means of a standard profilometer, for example.

Additionally, the disclosed outer surface coating can be functioned as a protective layer of the bias charging member to overcome issues due to direct contact with related printer members. In one example, use of the outer surface coating can provide uniform charging and desirable chargeability as compared with conventional BCRs without the coatings.

Print quality can thus be improved by using the disclosed outer surface coating 129. Furthermore, the outer surface coating 129 can allow for refurbishing of conventional BCRs or the disclosed exemplary BCRs 120 A-C. In general, when the outer surface of a BCR becomes too damaged to provide acceptable prints, it should be returned for refurbishing. In embodiments, refurbishing can involve applying the disclosed outer surface coating 129. By applying the protective outer surface coating 129 to a BCR having a damaged surface, either already with or without the protective layer, a BCR can be used multiple times.

EXAMPLES

An exemplary dispersion was prepared by ball milling a mixed sample including multi-walled carbon nanotubes (MWCNT; supplied from Nanostructured & Amorphous Materials, Inc. Houston, Tex.) having a diameter of about 20-40 nm, a length of about 1-2 μm and a surface area of 40-600 $m^2/g$ with CAPA 6250 polycaprolactone (supplied from Perstorp, Sweden) in a solvent of toluene. The dispersion included about 3 wt % carbon nanotubes and was approximately 18% solids by weight. To form the dispersion, about 200 g ⅛" stainless steel shot was added into the mixed sample and then roller milled over the course of about 4 days. The dispersion was then filtered through a cotton-tip filter to remove the milling balls and was coated on a Imari BCR using a Tsukiage coater to give a coating thickness of about 6 μm. The coated roller was then dried in a convection oven at about 140° C. for about 15 minutes to form an exemplary BCR having a MWCNT-containing coating as an outer surface coating.

Accelerated testing of the formed BCR was performed with a print cartridge wear test fixture. The testing involved initial screening (time=0), which included resistance and charge uniformity measurements, and the print test. The formed BCR was subjected to wear for about 50,000 cycles in the wear fixture, followed by a screening under the same procedures as for the time zero screening. The same process continued, i.e. screening at successive 50 thousand intervals in the wear fixture, until print streaks appeared.

The charge uniformity of the resulting BCR was observed greater than a control BCR with no MWCNT-containing coating, before and after 50 kilocycle wear testing on a Hodaka fixture. Additionally, no electrical charge build-up or deterioration of charge capacity was observed. Further, the formed BCR having the MWCNT-containing coating did not display any torque issues from the starting torque to the running torque data, as compared to the control BCR with no MWCNT-containing coating.

Printed image with high quality was also obtained due to application of the MWCNT-containing coating on a conventional or control BCR. For example, the scanned print image from an Imperia machine equipped with the coated BCR after 50 kilocycle wear on the Hodaka fixture showed no print defects after subjecting to this 50 kilocycle wear. In contrast, the printed image obtained from the control BCR with no coating showed significant amount of streaks. The life time of the formed BCRs was extended due to application of the MWCNT-containing coating.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising". Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A bias charging member comprising:
   a conductive substrate; and
   an outer surface coating disposed over the conductive substrate, the outer surface coating comprising a plurality of carbon nanotubes (CNTs) combined with one or more polymers to provide a surface roughness $R_z$ ranging from about 2 µm to about 20 µm,
      wherein the one or more polymers comprise a polycaprolactone (PCL) that is thermoplastic and has a weight average molecular weight ranging from about 10,000 to about 80,000,
      wherein the one or more polymers form polymer particles having an average size ranging from about 20 nm to about 10 µm, and
      wherein the outer surface coating has a thickness ranging from about 1 µm to about 100 µm.

2. The member of claim 1, wherein the plurality of CNTs has an average outer diameter ranging from about 10 nm to about 90 nm or a surface area ranging from about 20 $m^2/g$ to about 1,000 $m^2/g$.

3. The member of claim 1, wherein the plurality of CNTs has an average aspect ratio ranging from about 10 to about 300.

4. The member of claim 1, wherein each of the plurality of CNTs comprises a single wall carbon nanotube (SWCNT), a multi-wall carbon nanotube (MWCNT), or a combination thereof.

5. The member of claim 1, wherein the plurality of CNTs are present in an amount ranging from about 0.1% to about 4% by weight of the outer surface coating.

6. The member of claim 1, wherein polycaprolactone has a weight average molecular weight ranging from about 20,000 to about 50,000.

7. The member of claim 1, wherein the outer surface coating comprises the plurality of CNTs dispersed in a polymer matrix formed by the one or more polymers.

8. The member of claim 1, wherein the outer surface coating comprises a plurality of polymer particles formed by the one or more polymers, wherein the plurality of polymer particles has an average particle size ranging from about 20 nm to about 10 µm.

9. The member of claim 8, wherein the outer surface coating further comprises a polymer matrix formed by a portion of the one or more polymers or a second polymer, wherein both the plurality of polymer particles and the plurality of CNTs are dispersed within the polymer matrix.

10. The member of claim 1, wherein the outer surface coating comprises a CNT-polymer complex formed by the one or more polymers with one or more CNTs of the plurality of CNTs.

11. The member of claim 1, wherein the outer surface coating has a surface resistivity ranging from about $10^5$ ohm/square to about $10^{10}$ ohm/square.

12. A method of forming a bias charging member comprising:
   providing a dispersion comprising a plurality of carbon nanotubes (CNTs) and one or more polymers;
      wherein the one or more polymers comprise a polycaprolactone that is thermoplastic and has a weight average molecular weight ranging from about 10,000 to about 80,000, and wherein the one or more polymers form polymer particles having an average size ranging from about 20 nm to about 10 µm;
   applying the dispersion to an outer base layer, wherein the outer base layer is provided over a conductive substrate; and
   solidifying the applied dispersion to form an outer surface coating on the outer base layer such that the outer surface coating has a surface roughness $R_z$ ranging from about 2 µm to about 20 µm and a thickness ranging from about 1 µm to about 100 µm.

13. The method of claim 12, wherein the dispersion comprising the plurality of CNTs and the one or more polymers has a weight percentage for solids ranging from about 5% to about 60%.

14. The method of claim 12, wherein the one or more polymers comprise a plurality of polymer particles having an average particle size ranging from about 20 nm to about 10 µm dispersed within the outer surface coating.

15. The method of claim 12, wherein the outer base layer has a thickness ranging from about 10 mm to about 20 cm.

16. The method of claim 12, wherein the outer base layer has a surface resistivity ranging from about $10^6$ ohm/square to about $10^{13}$ ohm/square.

17. The method of claim 12, wherein the outer base layer is formed of a material selected from the group consisting of isoprenes, chloroprenes, epichlorohydrins, butyl elastomers, polyurethanes, silicone elastomers, fluorine elastomers, styrene-butadiene elastomers, butadiene elastomers, nitrile elastomers, ethylene propylene elastomers, epichlorohydrin-ethylene oxide copolymers, epichlorohydrin-ethylene oxide-allyl glycidyl ether copolymers, ethylene-propylene-diene (EPDM) elastomers, acrylonitrile-butadiene copolymers (NBR), natural rubbers, and combinations thereof.

18. A bias charging device comprising:
   a bias charging member comprising a conductive substrate and an outer surface coating disposed over the conductive substrate, the outer surface coating comprising a plurality of carbon nanotubes (CNTs) combined with one or more polymers, wherein the outer surface coating has a surface resistivity ranging from about $10^5$ ohm/square to about $10^{10}$ ohm/square, a thickness ranging from about 1 μm to about 100 μm, and a surface roughness $R_z$ ranging from about 2 μm to about 20 μm;

wherein the one or more polymers comprise a polycaprolactone (PCL) that is thermoplastic and has a weight average molecular weight ranging from about 10,000 to about 80,000, wherein the one or more polymers form polymer particles having an average size ranging from about 20 nm to about 10 μm; and wherein the one or more polymers are in a form of a polymer matrix, a plurality of polymer particles, and their combinations.

19. The member of claim 18, wherein the conductive substrate has a shape selected from the group consisting of a roller, a belt, and a drelt.

* * * * *